US010878479B2

(12) United States Patent
Wu et al.

(10) Patent No.: US 10,878,479 B2
(45) Date of Patent: Dec. 29, 2020

(54) RECOMMENDATION THROUGH CONVERSATIONAL AI

(71) Applicant: Microsoft Technology Licensing, LLC, Redmond, WA (US)

(72) Inventors: Xianchao Wu, Tokyo (JP); Wei Wu, Beijing (CN); Keizo Fujiwara, Kanagawa (JP); Zhan Chen, Tokyo (JP); Momo Klyen, Tokyo (JP); Jyunnya Saiki, Tokyo (JP); Akihiro Okuzawa, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 391 days.

(21) Appl. No.: 15/399,035

(22) Filed: Jan. 5, 2017

(65) Prior Publication Data
US 2018/0189857 A1 Jul. 5, 2018

(51) Int. Cl.
*G06Q 30/06* (2012.01)
*G06F 40/30* (2020.01)
*G06Q 50/00* (2012.01)
*G06N 20/00* (2019.01)
*G06F 40/35* (2020.01)
*G10L 15/18* (2013.01)

(52) U.S. Cl.
CPC ......... *G06Q 30/0631* (2013.01); *G06F 40/30* (2020.01); *G06F 40/35* (2020.01); *G06N 20/00* (2019.01); *G06Q 50/01* (2013.01); *G10L 15/1822* (2013.01)

(58) Field of Classification Search
CPC .............................................. G06Q 30/06–08

USPC ................................................ 705/26.1–27.2
See application file for complete search history.

(56) References Cited

U.S. PATENT DOCUMENTS

| 7,337,458 | B2* | 2/2008 | Michelitsch ........... G06Q 30/02 725/46 |
| 8,626,587 | B2 | 1/2014 | Kandanala et al. |
| 8,953,764 | B2 | 2/2015 | Bouzid et al. |
| 9,189,742 | B2 | 11/2015 | London |
| 9,336,277 | B2 | 5/2016 | Behzadi et al. |
| 9,424,861 | B2 | 8/2016 | Jerram et al. |
| 9,805,018 | B1* | 10/2017 | Richfield ............ G06F 17/2705 |

(Continued)

OTHER PUBLICATIONS

What is natural language, definition. Available at: https://whatis.techtarget.com/definition/natural-language.*

(Continued)

*Primary Examiner* — Ming Shui
(74) *Attorney, Agent, or Firm* — Merchant & Gould

(57) ABSTRACT

The present disclosure is directed to systems, methods and devices for providing product and service recommendations to users via conversational AI dialog. A natural language user input may be inspected. One or more product-related keywords from the inspected natural language user input may be extracted. A user profile for a user may be analyzed and a determination regarding one or more categories from the user profile that are related to the extracted product-related keywords may be made. One or more match values connecting the natural language user input to one or more candidate product recommendations may be calculated. The one or more candidate product recommendations may be ranked and a product recommendation based on the ranking may be provided.

20 Claims, 10 Drawing Sheets

(56) References Cited

U.S. PATENT DOCUMENTS

| | | | |
|---|---|---|---|
| 2008/0298562 A1* | 12/2008 | Ju | G10L 15/005 379/88.18 |
| 2009/0063146 A1* | 3/2009 | Yoshioka | G10L 17/26 704/250 |
| 2011/0153317 A1* | 6/2011 | Mao | G10L 17/26 704/208 |
| 2012/0016678 A1 | 1/2012 | Gruber et al. | |
| 2012/0066072 A1* | 3/2012 | Kanigsberg | G06Q 30/02 705/14.66 |
| 2012/0095835 A1* | 4/2012 | Makar | G06Q 10/10 705/14.53 |
| 2012/0239440 A1* | 9/2012 | Miller | G06F 17/2785 705/5 |
| 2015/0170250 A1* | 6/2015 | Dalal | G06Q 30/0641 705/26.7 |
| 2015/0382147 A1 | 12/2015 | Clark et al. | |
| 2016/0163311 A1 | 6/2016 | Crook et al. | |
| 2017/0091838 A1* | 3/2017 | Cunico | G06F 16/36 |
| 2017/0193997 A1* | 7/2017 | Chen | G10L 17/22 |
| 2017/0250930 A1* | 8/2017 | Ben-Itzhak | G06F 3/0488 |

OTHER PUBLICATIONS

Chai, et al., "Natural Language Assistant—A Dialog System for Online Product Recommendation", In AI Magazine, vol. 23, No. 2, 2002, pp. 63-76.

Kelion, Leo, "Artificial intelligence: How to turn Siri into Samantha", http://www.bbc.com/news/technology-26147990, Feb. 13, 2014, 6 pages.

"How Nina Web is used", https://web.archive.org/web/20141112181717/http:/www.nuance.com/for-business/customer-service-solutions/nina/nina-web/index.htm, Nov. 12, 2014, 3 pages.

* cited by examiner

RECOMMENDATION THROUGH CONVERSATIONAL AI

BACKGROUND

Marketing is increasingly moving in the direction of attempting to personalize product and service recommendations to potential consumers. In order to personalize recommendations, businesses and their third-party affiliates collect a wide range of data associated with potential consumers' online presence. Despite the vast amount of potential consumer information available to businesses via such data collection, potential consumers' are often provided with recommendations that remain unhelpful.

Additionally, although relatively specific problems are discussed, it should be understood that the aspects should not be limited to solving only the specific problems identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods and devices for providing product recommendations, comprising: inspecting a natural language user input; extracting one or more product-related keywords from the inspected natural language user input; analyzing a user profile for the user and determining one or more categories from the user profile that are related to the extracted one or more product-related keywords; calculating, based on the product-related keyword extraction and the user profile analysis, one or more match values connecting the natural language user input to one or more candidate product recommendations; ranking the one or more candidate product recommendations; and providing a product recommendation based on the ranking.

DETAILED DESCRIPTION

Figure 1:
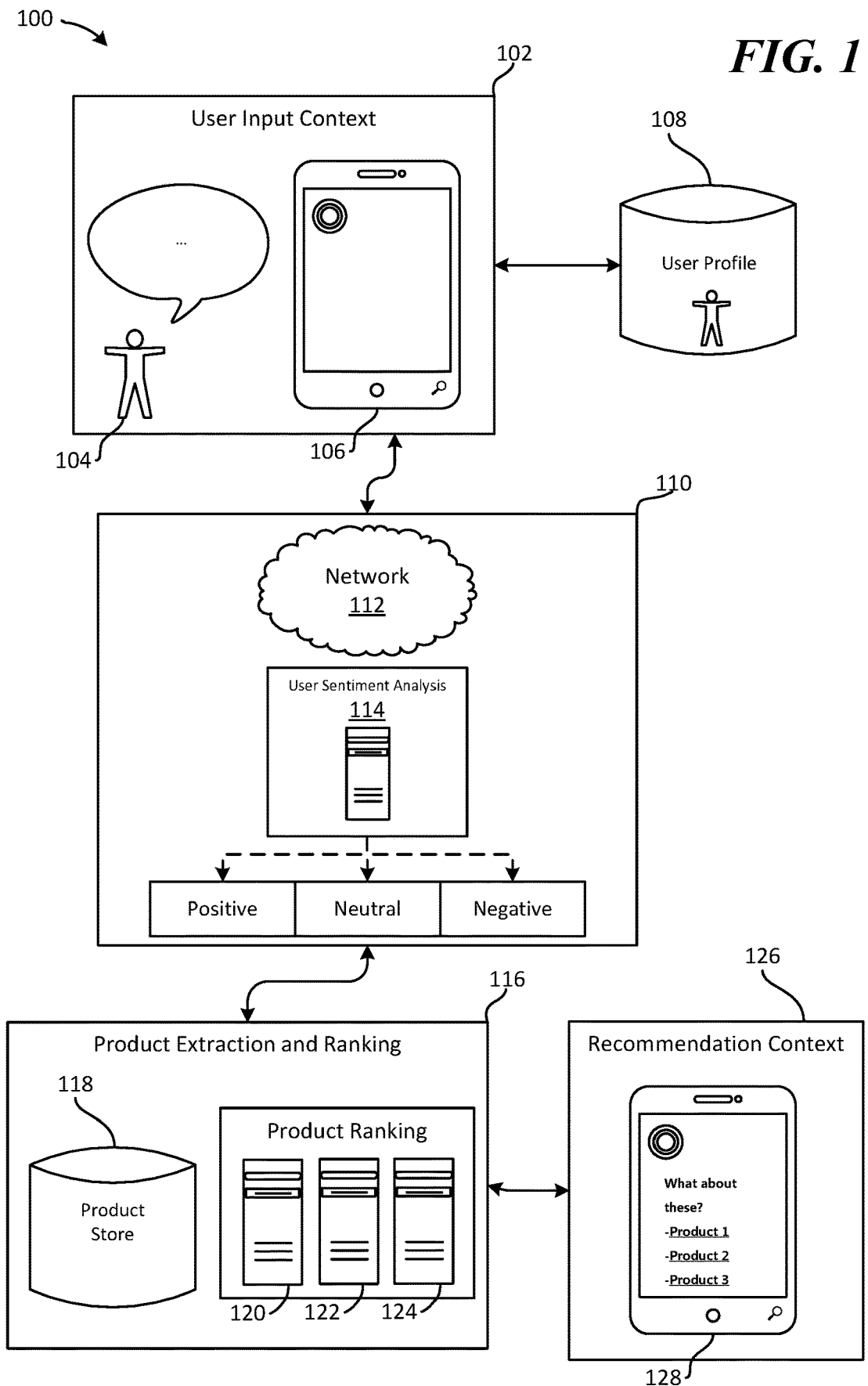
FIG. 1 illustrates an exemplary schematic diagram of an environment for providing conversational AI product recommendations.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally the present disclosure is directed to systems, methods and devices for delivering personalized AI product and service recommendations to users. Although the terms "product" and "service" are used individually when describing certain exemplary embodiments herein, those terms are interchangeable and/or additional to one another according to the scope of this disclosure.

Exemplary mechanisms for delivering product and service recommendations to users through conversational AI include analyzing current user input and a user profile comprised of past user input as well as the implementation of product and service recommendation models that are based on extraction of product and service information from business resources (e.g., business websites containing product and service information, business applications containing product and service information, and business application feeds containing product and service information), analysis of the product and service related data that has been extracted from those resources, matching of products and services based on that analysis for specific users, and the delivery of personalized product and service recommendations to users through conversational AI.

According to examples, the systems and methods described herein, in addition to providing users with personalized product and service recommendations, may provide additional content regarding those products and services such as addresses of brick and mortar locations that offer recommended products and services, support of users' conversational queries and the offering of consumer services that assist in maintaining relationships between users and companies.

Certain aspects of the disclosure relate to user query and profile modeling for providing tailored product recommendations that take into account user traits that have been identified based on past user input and user sentiment towards one or more categories of potential product recommendations. According to examples a user profile that identifies various characteristics of a user may be built from data extracted from past interactions the user has had with an AI system implementing the systems and methods described herein. A user may provide input into the AI system via queries, statements, and other interactions that may be inspected and determinations of traits made therefrom. Examples of user traits that can be determined from such analysis include: gender, age, and country affiliation, among others. Past user interactions with the AI system may also provide indications regarding user propensity and preferences that are utilized in determining appropriate products to recommend to users.

According to examples one or more signals from user input may be analyzed in determining various traits and characteristics of a user that may be utilized in determining appropriate products and services to surface as recommendations for a user during conversational AI interaction. Signals such as pitch, range, amplitude, and frequency of received voice data may be analyzed, for example, and one or more of such signals may be introduced as input to user character trait/characteristic engines for determining whether a user meets various threshold criteria for certain traits and characteristics that may be utilized in providing personalized product recommendations for specific users.

According to some examples gender detection voice analysis models may analyze voice signals and determine that a user is a male or female based on those signals, machine learned voice detection models may be implemented to determine accent type for users, and voice detection analysis models may analyze voice signals and determine that a user likely falls into a certain age group. Other trait categorizations may also be made based on voice analysis in accordance with the description provided herein.

According to additional examples natural language processing and machine learning may be utilized in categorizing past user input and determining appropriate products and services as recommendations for a user. For example, various categorizations of user input utilizing natural language processing and machine learning may be made regarding user traits and preferences. In addition or alternative to utilizing voice analysis, determinations may be made from categorization of past user input that a user likely meets one or more thresholds related to the user being likely being associated with one or more characteristics such as gender, age and country of identification. These categorizations may be implemented by code strings such as (for gender) <user id, queries> and based on analysis of past user input analysis an output such as "male" or "female" may be provided Similarly, a code string such as <user id, queries> may return an output of "10+", "20+", "30+", "40+" based on various analysis of past user input (e.g., "I am a middle school student" "I am graduating next year—where are the best job markets?"). According to another example a code Determined user characteristics may be implemented in query intention models that determine match values between determined user characteristics and product categories. For example, a determination may be made from one or more query intention models that a user would prefer to see information related to men's clothing based on a determination that a user is male. A determination may be made to recommend renting one set of movies to a user that is determined to fall into a younger age group, and a determination may be made to recommend renting a second set of movies to a user that is determined to be in an older age group. According to another example a determination may be made that a user would prefer to receive a recommendation to view a specific sporting event (e.g., an Australian team vs. a U.S. team) based on a determined country of origin.

Machine learning may be implemented according to examples in the training of classifiers determined from user input. Such training data may include classifiers such as <user id, queries, target tags> as determined from analyzed user input. Training may include query intension models, word N-gram language modeling, character N-gram language modeling, word skip-grams, brown cluster N-grams, part-of speech-tags, social network related word analysis (e.g., number (in query) of hashtags, emoticons, elongated words, punctuations, etc.), and Word2Vec cluster N-grams, among others.

Past user input may be grouped into product match categories based on determined user preferences from extraction and analysis of past user input. Past user input may be analyzed for language patterns indicating users' like, dislike, and/or indifference towards various product types. Various products and services may be categorized according to examples described herein (e.g., categorization based on extracted product and service information from conversational AI account owners such as businesses and other entities affiliated with those product and services) and a match analysis between determined product preferences from a user profile may be matched to those products as categorized.

Past user input may be analyzed for language patterns indicating users' like, dislike, and/or indifference towards products and such analysis may be based on various determinations that can be made from machine language analysis. Machine language analysis of past user input to identify such preferences may include one or more language models that utilize keyword extraction, clustering, and/or high value determination language analysis. For example, keywords regarding one or more product or service may be identified, those keywords may be clustered based on their relevance to various products and services within a cluster hierarchy, and high value determination language analysis may be applied to match keywords from past user input to product and service clusters.

A sentiment analysis model may be implemented according to some examples. A user input may be inspected and product-related keywords, extracted, and analyzed. Language models may be implemented that analyze qualifying language as it relates to product-related keywords. According to examples, extraction of keywords and analysis of qualification language as it relates to product-related keywords is inspected and analyzed in determining whether a user is positive towards, negative towards, or neutral towards (or any value falling amongst those quantifiers) a potential product recommendation.

Various models may be utilized in determining user sentiment towards products and services. For example, user input may be analyzed against a human trained corpus comprised of keywords and phrases as they relate to user emotion and sentiment. Word N-gram models may be used to analyze user input and queries (e.g., unigrams and bigrams for words in a query). Character N-gram models may be implemented for analyzing text in non-Roman language types, word-skip gram models may be utilized (e.g., for trigrams and 4-grams in a query one of the words may be replaced by "*" to indicate the presence of non-contiguous words). Brown cluster N-gram models may be implemented to represent words (from a user query) and extract unigram and bigram features. Part-of-speech tagging models may be implemented (e.g., the presence or absence of part-of-speech tags may be used as binary features). Sentiment lexicon models may be utilized for morphologically rich languages (e.g., Japanese, Korean, Turkish) to effectively make use of linguistic information such as the semantic classes of words, semantic scope of negation terms like "not," "no" and the functional meaning of modal affixes. Social network analysis models may be employed (e.g., number (in query) of hashtags, emoticons, elongated words, punctuation use), and Word2Vec cluster N-gram models may be implemented in performing dimensional word embedding from social network datasets. Various machine models may be trained to further enhance sentiment analysis of user input based on one or more of the above-described analyses.

A product recommendation model is provided for determining products that are associated with official company accounts, associating relevant content with those determined products based on extraction of material from resources related to the owner of the conversational AI account, categorizing product information, and matching products and associated information to users during conversational AI experiences based on rakings of potential product recommendations and user input related to those potential product recommendations.

Conversational AI recommendations may be based on models such as: product models, product trigger models, product candidate ranker models, and product response models.

Product models may crawl data from websites related to resources provided by the owner of the conversational AI, or from other editorial data which is maintained by the owner of the conversational AI. According to examples that data may be clustered by various clustering mechanisms such as latent Dirichlet allocation (LDA) and/or hierarchical Dirichlet process (HDP), and hierarchical clusters may be built from that data. An active learning framework may be utilized to tailor AI responses, and editorial data such as related keyword extraction and categorization from resources related to the owner of the conversational AI.

Product trigger models are provided for triggering recommendations to users based on determined user intent. According to examples valuable product-related keywords are determined utilizing functions that determine how important a word is to a portion of language input (e.g., TF-IDF), products are ranked based on best matching functions as they relate to user input (e.g., BM25), and the impact of user intent words on match analysis is broadened by implementing models that produce word embeddings (e.g., Word2Vec analysis).

FIG. 1 illustrates an exemplary schematic diagram of a conversational AI environment 100 for providing product and service recommendations. Conversational AI environment 100 includes user input context 102, user profile 108, user sentiment analysis context 110, product extraction and ranking context 116 and recommendation 126. In user input context 102 a user such as user 104 may provide one or more inputs to a conversational AI system via a computing device such computing device 106. The conversational AI systems described herein may provide conversational responses to user input through chat bots which may be associated with businesses, universities, non-profit organizations, and the like. Chat bots and other conversational AI's may provide text and vocal conversational dialog to a user based on extraction and analysis of content from websites associated with those entities, applications associated with those entities and personalized digital assistants associated with those entities. Recommendations may be provided to a user via a computing device such as computing device 128, which may or may not be the same computing device as computing device 106, during recommendation context 126.

According to examples user 104 may communicate with computing device 106 and one or more websites, applications and personalized digital assistants associated with conversational AI's in the form of voice and text input. Data from user input may be extracted, processed, and stored in user profile 108. User profile 108 may include various classifications of extracted user input (e.g., extracted keywords and phrases). Such classifications may include identification of traits and characteristics of a user such as age, gender, location, country of origin, etc. User profile 108 may additionally or alternatively include classification of extracted user data into match categories related to one or more products and services associated with one or more conversational AI's. The user profile 108, in addition to a current user input, may be utilized by the systems and methods described herein during product and service recommendation ranking in determining relevant products and services to suggest to users.

User input from user 104 may be provided to one or more computing devices (such as user sentiment analysis server device 114), via network 112, for sentiment analysis regarding one or more products or services that may be recommended to user 104 via a computing device such as computing device 128 during recommendation context 126. User sentiment analysis server 114 may extract one or more keywords from a user input and/or analyze user input with one or more language models and thereby make determinations regarding a user's positive, neutral or negative sentiment towards one or more products or services which may be recommended to a user based on the extracted input. Such determinations may be made based on a single user input or a back-and-forth dialog received during conversational AI.

According to examples user 104 may provide input such as "I'm thirsty but so busy today" and a response to user 104 may be provided by a chat bot such as "It's time to stop for a coffee! How would you like a Pikes Place roast coffee from a Starbucks around the corner at this address: [ADDRESS] ?" Further dialog may indicate that user 104 currently has a negative sentiment towards such a product. Continuing from this example, a user may answer "No thanks" and user sentiment analysis may determine that the user is not currently interested in the product offering. Additional dialog may determine that user 104 is interested in other products. For example, user 104 may provide input such as "do you have XYZ brand of coffee" and user sentiment analysis may determine that the user is interested in having XYZ brand of coffee shipped to them and/or nearby locations that sell XYZ brand of coffee provided to them.

Product extraction and ranking context 116 includes product store 118 and computing devices (such as product ranking server devices 120, 122 and 24) for ranking products and services for recommendation to a user based on extracted and analyzed user input and a match analysis of those products and services to a user based on analysis of current user input and information regarding user characteristics and preferences determined from a user profile such as user profile 108. In the specific example described above with regard to user sentiment for coffee recommendations where user 104 has provided input such as "do you have XYZ brand of coffee" one or more recommendations relating to XYZ brand of coffee may be ranked and subsequently provided to user 104 based on the ranking and a conversational AI response may be provided such as "Of course, I'll recommend a 1000 mL pack of XYZ coffee for you which can be purchased at this link: [LINK]."

In ranking product and service recommendations data may extracted and analyzed from resources related to the owner of the conversational AI (e.g., websites, applications and feeds associated with companies and their related products and services). For example, a website crawler may analyze text and embedded content from company websites, products and services offered by that company may be determined from that analysis, information related to those products and services may be determined from analysis of website content as it relates to those offerings, and products and services may be categorized for user recommendation match ranking in a product store such as product store 118.

Match ranking may take into account one or more user inputs from a current user interaction with conversational AI and/or information determined from a user profile such as user profile 108. For example, during runtime when latency is determined to be of high importance, a user input (such as a user query) may be received and recommendations may be ranked and provided to a user by transferring the user input and relevant content from a user profile to a product trigger module and a chat module in parallel. If a determination is made from the trigger module that a product or service recommendation should be triggered based on determined intent from the user input and the user profile, the trigger module may send a list of product candidates for product ranking. With those potential chat candidate recommendations a final ranker may determine whether a chat response including one or more product recommendations should be provided to the user.

According to other examples, during runtime when processing costs have been determined to be of higher concern, user input may be received and sent to a product trigger module with relevant information from a user profile and a recommendation may only be provided to a user upon the product trigger module detecting a positive sentiment, in which case a positive signal may be sent to a product candidate ranker module for determining the best recommendations to provide to the user. Alternatively, if negative sentiment is detected by the product trigger module one or more chat candidate rankers may be triggered to return a chat response to the user during conversational AI which can be used to further assess user interest such that more useful product and service recommendations may be provided to the user.

An owner of the conversational AI may modify one or more mechanisms involved in ranking product candidates for recommendation. For example, a company may place additional emphasis on one or more of their product offerings such that product recommendation models are more heavily weighted in favor of recommending certain products which have been indicated by owners of conversational AI as more important than others. Those specified product offerings would then be ranked higher during the ranking process than would otherwise be the case according to baseline product recommendation models and their associated baseline algorithms.

Figure 2:
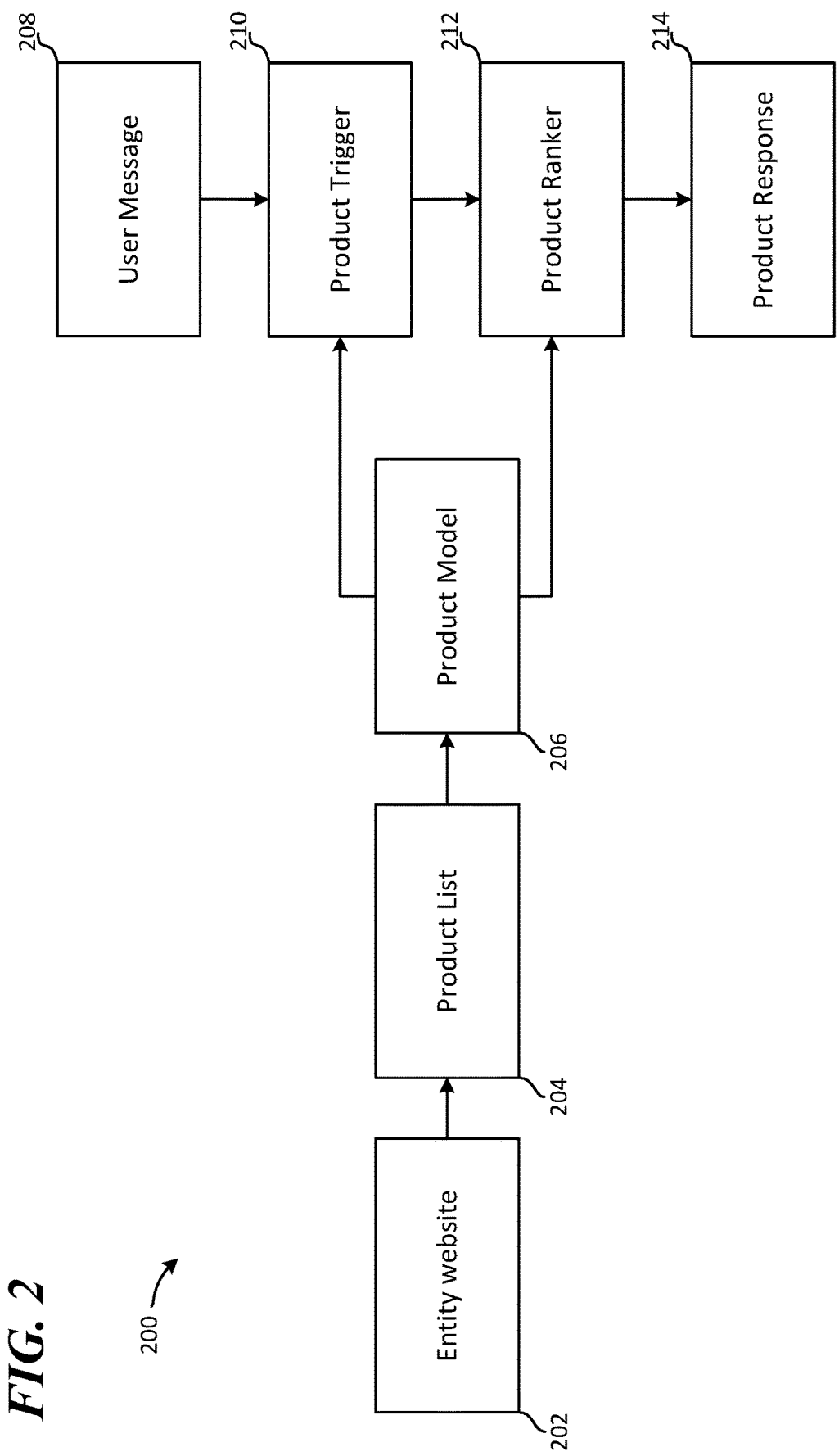
FIG. 2 illustrates an example diagram for delivering personalized product recommendations through conversational AI.

FIG. 2 illustrates an example workflow 200 for delivering personalized product recommendations through conversational AI. Workflow 200 includes element 202 where entity websites associated with an owner of the conversational AI are analyzed for products and services that an entity may offer. Identified products and services may be further categorized into product lists at element 204.

At element 206 one or more product models may be utilized to match products from a product list to a user through conversational AI. At element 208 a user input may be received. At element 210 a product trigger may be generated such that one or more user input types (e.g., context of input, language style of input, expressed interest/sentiment in a product or service, etc.) may be analyzed to determine whether one or more product or service match value thresholds have been met for providing a recommendation from the product list to a user. At element 212 a product ranker may rank each identified product or service based on its relevance to a user's input, and at element 214 a product or service recommendation may be provided (alone or in combination with other response information) to a user through conversational AI.

Figure 3:
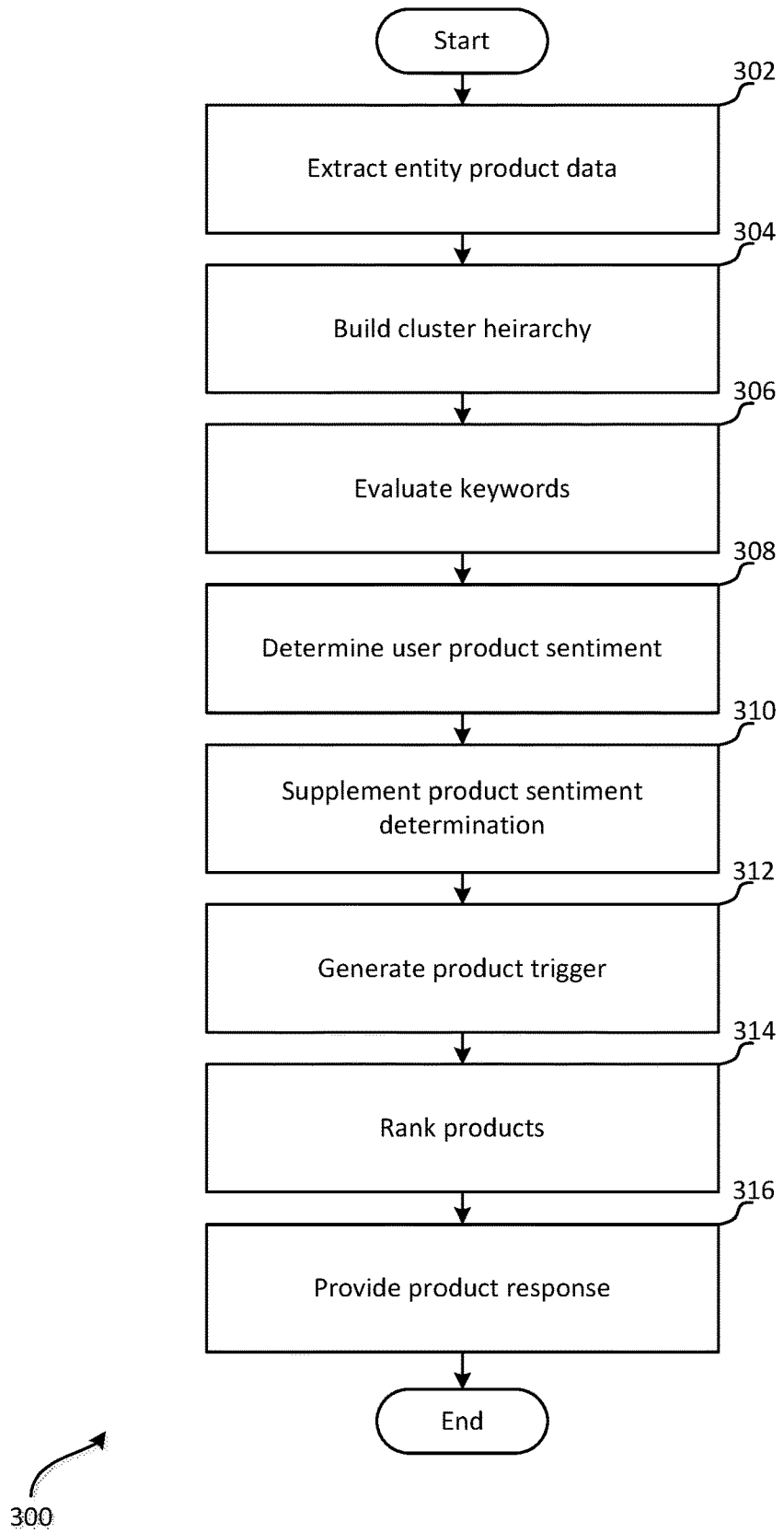
FIG. 3 illustrates an example method for delivering personalized product recommendations through conversational AI.

FIG. 3 illustrates an example method 300 for delivering personalized product recommendations through conversational AI. While the method is explained in relation to product recommendations, the same or similar steps may be utilized in providing service recommendations.

Method 300 begins at a start operation and continues to operation 302 where product data is extracted from official resources such as official company websites and applications. Flow then continues to operation 304 where a cluster hierarchy is built for products using one or more language models for inspecting and analyzing the content extracted from the official resources. The cluster hierarchy may be context based (e.g., products related to travel, sporting, clothing, etc.) and there may be various tiers of categorization of the products reflecting deeper categorization by specific type of product.

From operation 304 flow continues to operation 306 where keywords from a user input may be evaluated and contextually categorized. According to examples one or more of operations 302, 304 and 306 may be performed offline prior to determining a user's sentiment towards potential product recommendations and ultimately providing a product recommendation to the user.

At operation 308, based on language processing and machine learning, user input may be analyzed and determinations regarding the user's sentiment towards one or more products as positive, neutral or negative may be determined.

Moving to operation 310 the user input sentiment determination may be supplemented with additional information. For example, similar phrases and keywords from other conversational AI users may be analyzed as they relate to a current user input, past users input comprising similar queries and responses that generated positive feedback or results based on product recommendations may be analyzed, etc.

From operation 310 flow moves to operation 312 where a product trigger is generated. For example, a product trigger may be generated such that one or more user input types (e.g., context of input, language style of input, expressed interest/sentiment in a product or service, etc.) may be used to determine whether product content will be recommended to a user during a conversational AI dialog.

Moving to operation 314 products and related product content may be ranked based on their relevance to a user's current input and/or relevant information from the user's profile, and at operation 316 a product response may be provided to a user (alone or in combination with other contextually relevant response information) by a chat bot during a conversational AI dialog.

Figure 4:
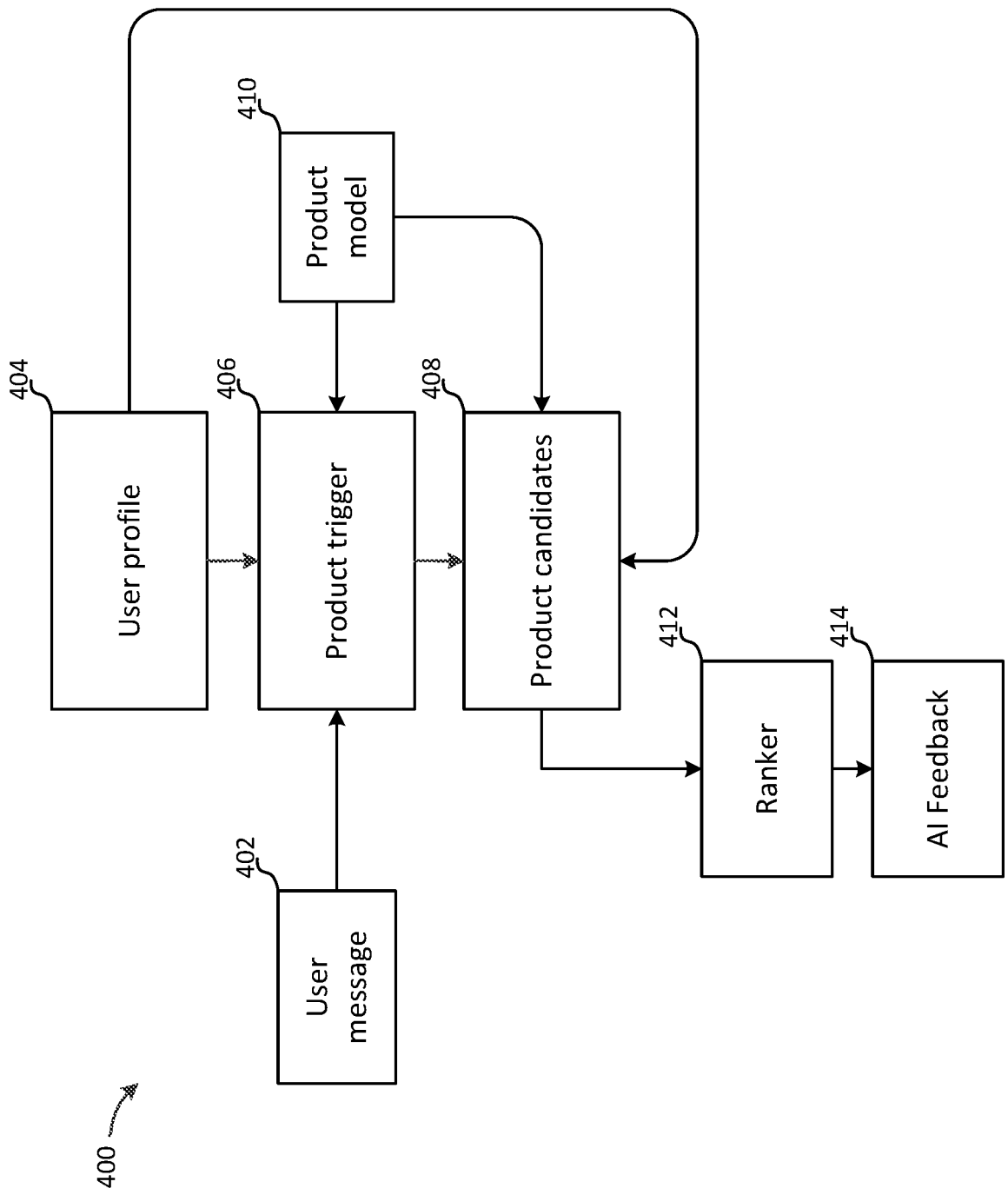
FIG. 4 illustrates an example workflow for providing personalized product recommendations through conversational AI.

FIG. 4 illustrates an example workflow 400 for providing personalized product recommendations through conversational AI. At element 412 of workflow 400 a user input/ message may be received in a conversational AI dialog context. Element 404 provides a user profile model which may include clustering of user input based on extraction of product-related keywords from past user input, determinations regarding user sentiment towards products from past user input and determined traits and characteristics of a user based on analysis of past user input.

User input may be provided to one or more product trigger modules encompassed by element 406 for determining whether user input warrants providing one or more product recommendations to a user during a conversational AI dialog based on a product trigger threshold from match analysis of analyzed user input and/or information from the user's profile. Element 410 includes product modeling including extraction of product-related data from resources related to the owner of the conversational AI such as websites and applications associated with the owner of the conversational AI and categorization of that data in a product store.

Product modeling included in element 410 may be utilized by the systems and methods described herein to create a list of available product candidates that a conversational AI offers at element 408 which can be ranked based on a match analysis between analyzed user input and an associated user profile by one or more ranking models provided at element 412. At element 414 feedback may be provided to a user in a conversational AI dialog based on the ranking performed in ranking element 412.

Figure 5:
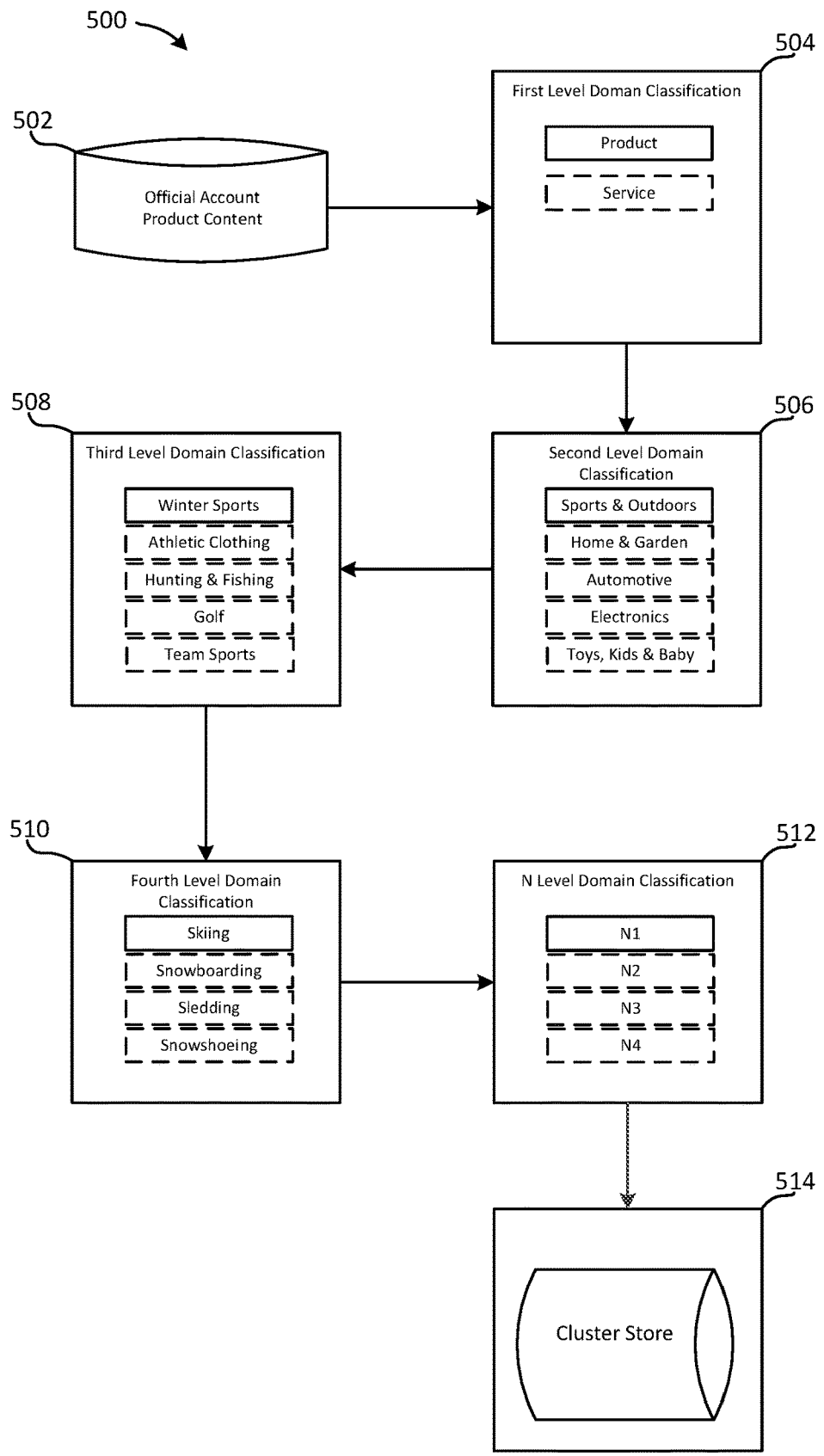
FIG. 5 illustrates hierarchical clustering of entity product and service offerings to a user through conversational AI.

FIG. 5 illustrates hierarchical clustering 500 of entity product and service offerings from official entity account product content. Information associated with one or more conversational AIs from entities may be extracted as it relates to products and services offered by those entities. At 504 first level domain classification of one or more identified product or service may be made. In this example a determination has been made that data extracted relates to an entity product. At 506 second level domain classification of the product is made. In this example a determination has been made that the product relates to sports and outdoors. At operation 508 third level domain classification is made. In this example a determination has been made that the product relates to winter sports. At 510 fourth level domain classification is made. In this example a determination has been made that the product relates to skiing. At 512 N level domain classification is made whereby the product may be classified into increasing levels of specificity. At 514 classification of one the product into N levels of domain may be stored for such that the classification can be used to provide an AI entity response to a user at a later time.

Figure 6:
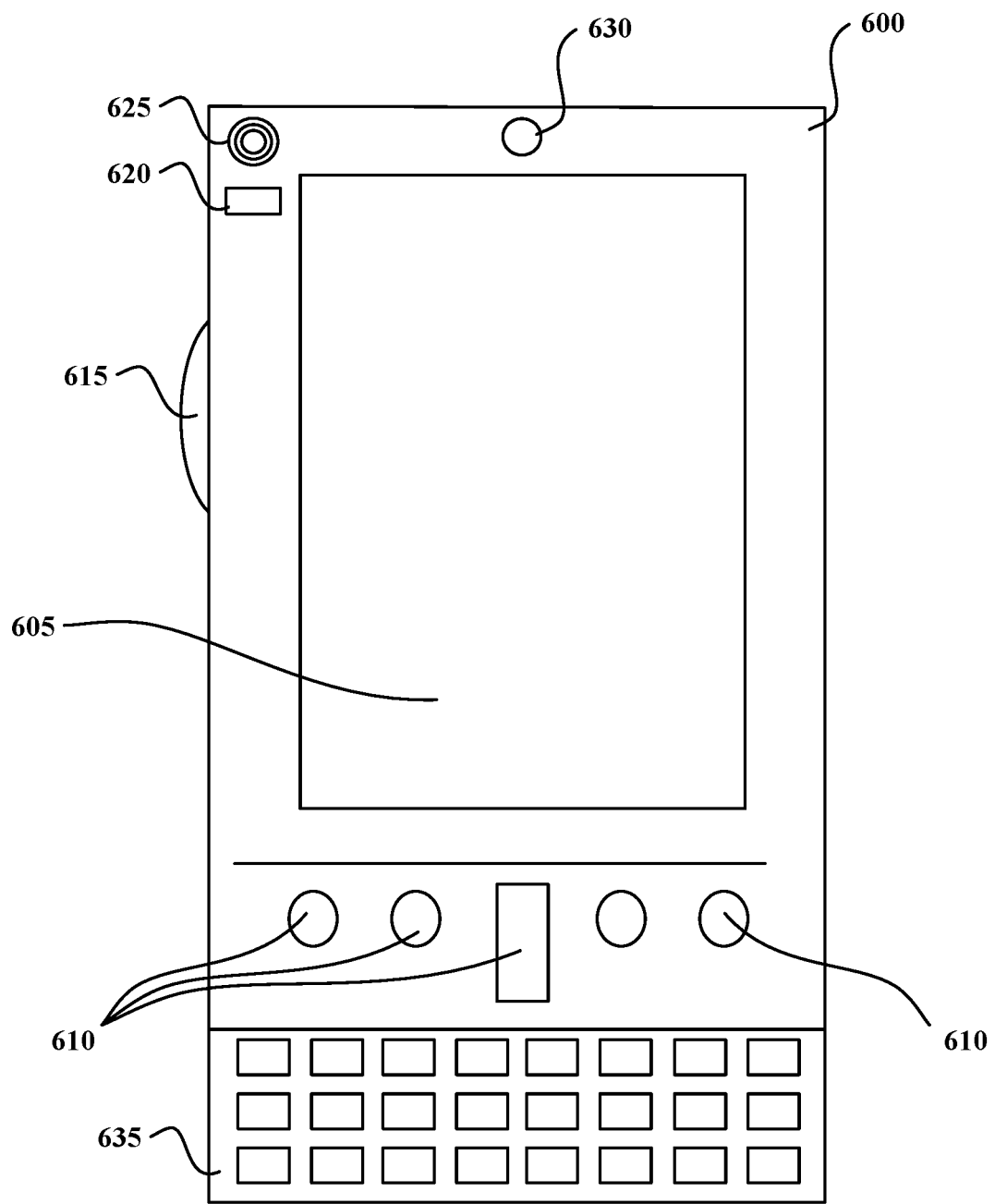
FIGS. 6 and 7 are simplified block diagrams of a mobile computing device with which aspects of the disclosure may be practiced.
Figure 7:
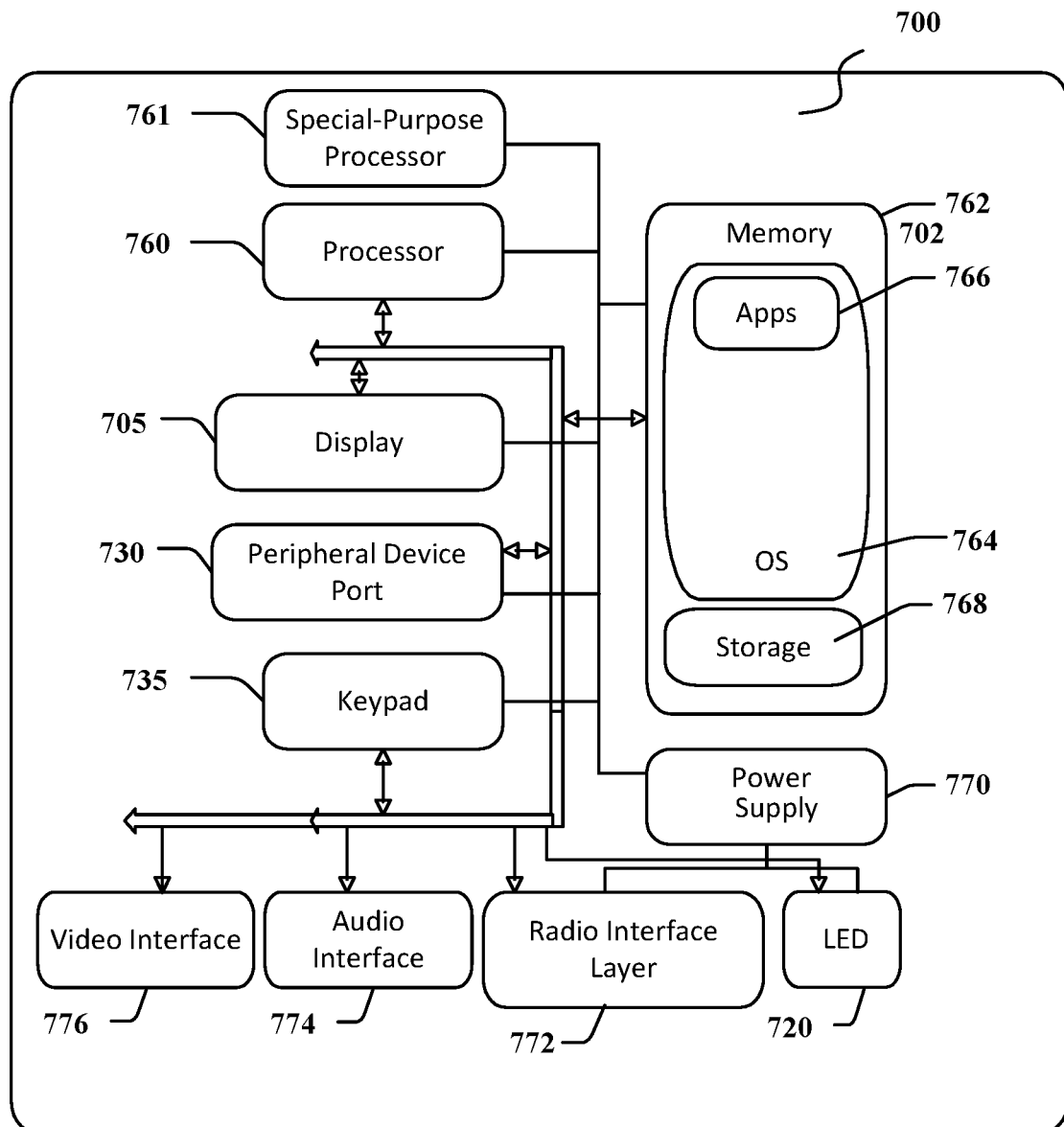

FIGS. 6 and 7 illustrate a mobile computing device 600, for example, a mobile telephone, a smart phone, wearable computer (such as a smart watch), a tablet computer, an e-reader, a laptop computer, and the like, with which embodiments of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing and operating a rules platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
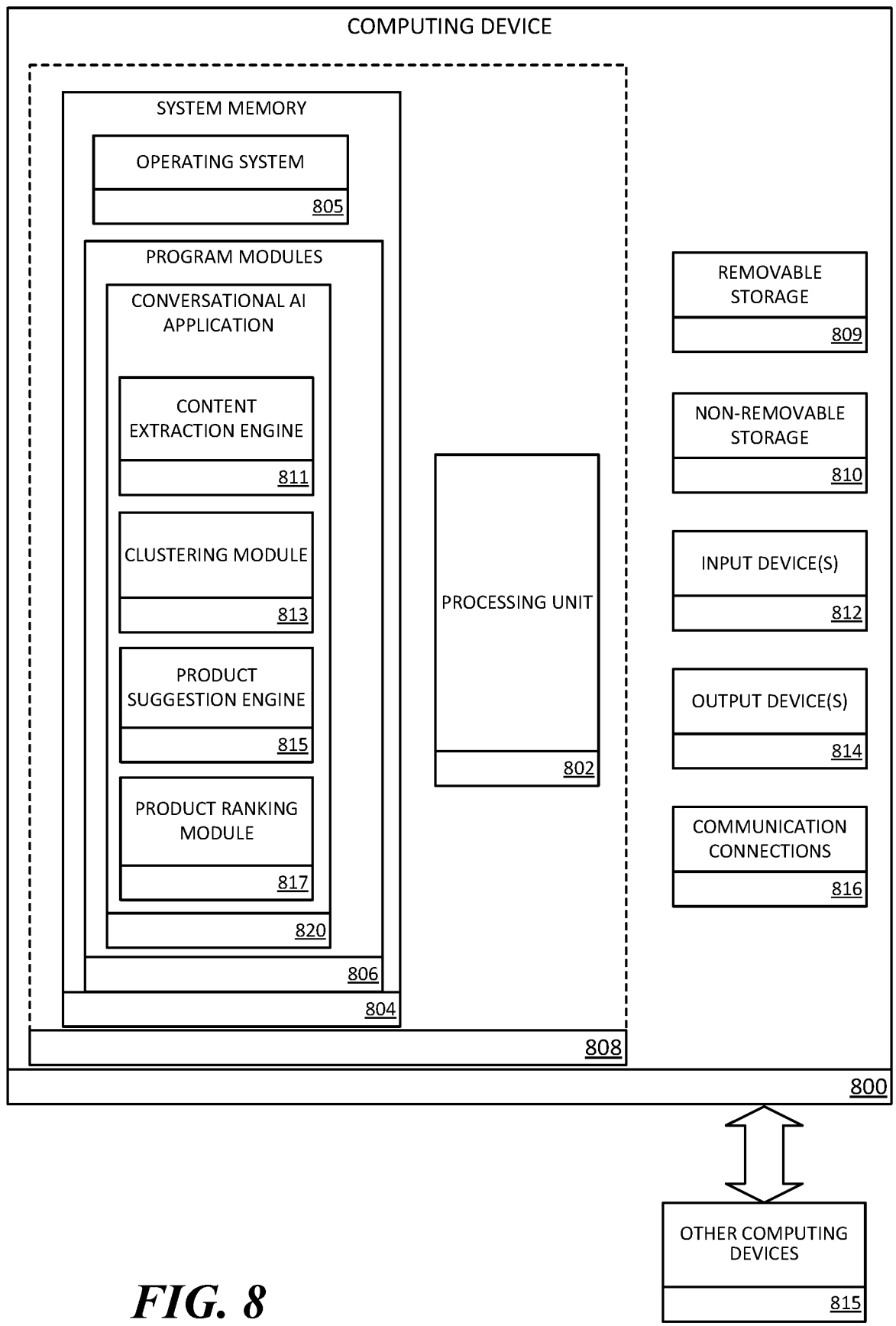
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with providing conversation AI on a computing device (e.g., server computing devices 114, 120, 122 and 124). In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more conversational AI programs or one or more components in regards to FIG. 1. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., conversational AI application 820) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 909, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
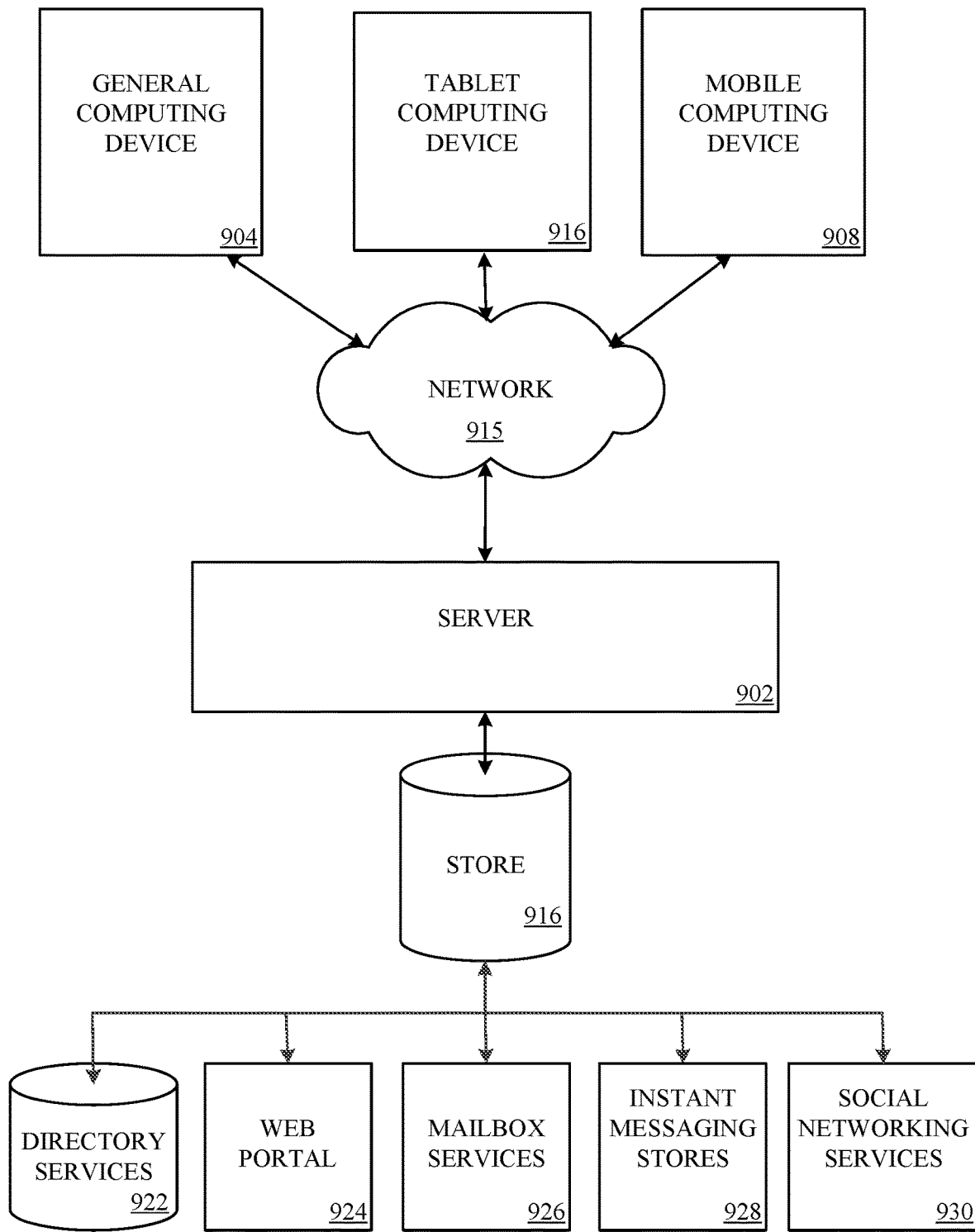
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The conversational AI application 806 may be employed by a client that communicates with server device 902, and/or the conversational AI application 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 7-10 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
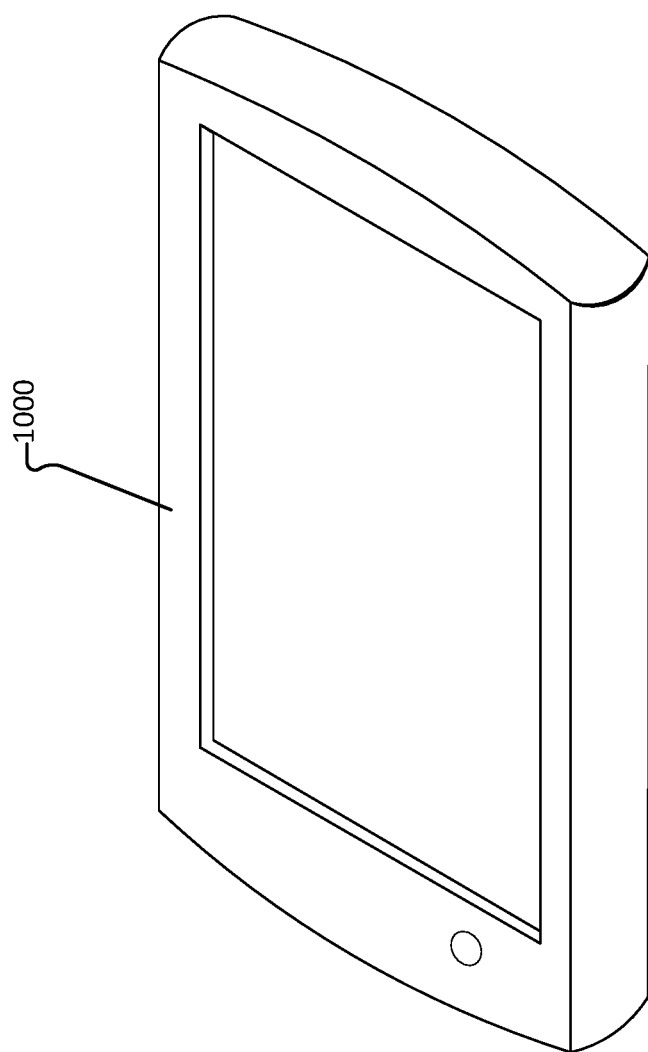
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A computer-implemented method for providing item recommendations by a conversational artificial intelligence, the method comprising:
receiving, by the conversational artificial intelligence, a natural language user input from a user;
extracting a first set of one or more item-related keywords from the natural language user input;
determining, from the natural language user input, that a first sentiment of the user towards the first set of one or more item-related keywords is not positive;
based on determining the first sentiment is not positive:
requesting an additional natural language user input;
extracting a second set of one or more item-related keywords from the additional natural language user input;
determining, from the additional natural language user input, that a second sentiment of the user towards the second set of one or more item-related keywords is positive; and
based on determining the second sentiment is positive:
analyzing, by a processor, a user profile for the user and determining one or more categories from the user profile that are related to the second set of one or more item-related keywords, wherein the one or more categories are at least in part based on a user characteristic relating to a user demographic trait;
determining, based at least on a similarity between the one or more categories and the second set of one or more item-related keywords, a matching value between the natural language user input and one or more candidate item recommendations;
determining whether to trigger an item recommendation by comparing the matching value to a recommendation strength threshold; and
only when the matching value exceeds the strength threshold:
triggering the one or more candidate item recommendations;
ranking the one or more candidate item recommendations; and providing an item recommendation based on the ranking, wherein the item is at least one of a product or a service.

2. The method of claim 1, wherein the one or more candidate item recommendations are derived from a machine learned item list populated from a plurality of official business accounts.

3. The method of claim 2, wherein the machine learned item list is populated from extraction and analysis of data from the plurality of official business accounts for a plurality of keywords and phrases related to one or more items that each of the plurality of official business accounts maintain.

4. The method of claim 3, wherein the plurality of official business accounts comprise one or more websites, one or more social media accounts, one or more social media feeds, and editorial content, generated by one or more entities affiliated with the plurality of official business accounts.

5. The method of claim 1, further comprising:
analyzing one or more adjacent words to the extracted second set of one or more item-related keywords;
determining that the one or more adjacent words are classifiers for the extracted second set of one or more item-related keywords; and
reducing a number of potential item recommendations based on the determining that the one or more adjacent words are classifiers.

6. The method of claim 1, wherein determining the first sentiment comprises utilizing a sentiment lexicon model.

7. A computer-readable storage device comprising executable instructions, that when executed by a processor, cause the processor to:
receive, by a conversational artificial intelligence, a natural language user input from a user;
extract a first set of one or more item-related keywords from the natural language user input;
determine, from the natural language user input, that a first sentiment of the user towards the first set of one or more item-related keywords is not positive;
based on determining the first sentiment is not positive:
request an additional natural language user input;
extract a second set of one or more item-related keywords from the additional natural language user input;
determine, from the additional natural language user input, that a second sentiment of the user towards the second set of one or more item-related keywords is positive; and
based on determining the second sentiment is positive:
analyze a user profile for the user and determine one or more categories from the user profile that are related to the second set of one or more item-related keywords, wherein the one or more categories relate to a user characteristic relating to a user demographic trait;
determine, based at least on a similarity between the one or more categories and the second set of one or more item-related keywords, a matching value between the natural language user input and one or more candidate item recommendations;
determine whether to trigger an item recommendation by comparing the matching value to a recommendation strength threshold; and
when the matching value exceeds the strength threshold:
trigger the one or more candidate item recommendations;
rank the one or more candidate item recommendations; and
provide an item recommendation based on the ranking, wherein the item is at least one of a product or a service.

8. The computer-readable storage device of claim 7, wherein the one or more candidate item recommendations are derived from a machine learned item list populated from a plurality of official business accounts.

9. The computer-readable storage device of claim 8, wherein the machine learned item list is populated from extraction and analysis of data from the plurality of official business accounts for a plurality of keywords and phrases related to one or more items that each of the plurality of official business accounts maintain.

10. The computer-readable storage device of claim 9, wherein the plurality of official business accounts comprise one or more websites, one or more social media accounts, one or more social media feeds, and editorial content, generated by one or more entities affiliated with the plurality of official business accounts.

11. The computer-readable storage device of claim 7, wherein the executable instructions further cause the processor to:
classify the natural language user input as it relates to an item recommendation as one of: a positive user input related to a potential item recommendation, a negative user input related to a potential item recommendation, and a neutral user input related to a potential item recommendation.

12. The computer-readable storage device of claim 7, wherein the executable instructions further cause the processor to:
analyze one or more adjacent words to the second set of one or more item-related keywords;
determine that the one or more adjacent words are classifiers for the second set of one or more item-related keywords; and
reduce a number of potential item recommendations based on determining the one or more adjacent words.

13. The computer-readable storage device of claim 7, wherein the first set of item-related keywords corresponds to a first product and wherein the second set of item-related keywords corresponds to a second product.

14. The computer-readable storage device of claim 13, wherein the first product and the second product correspond to a product category.

15. The computer-readable storage device of claim 13, wherein the first product corresponds to a first product category and the second product corresponds to a second product category, wherein the first product category is related to the second product category.

16. A system for providing item recommendations by a conversational artificial intelligence, the system comprising:
a memory for storing executable program code; and
a processor, functionally coupled to the memory, the processor being responsive to computer-executable instructions contained in the program code and operative to:
receive, by the conversational artificial intelligence, a natural language user input from a user;
extract a first set of one or more item-related keywords from the natural language user input;
determine, from the natural language user input, that a first sentiment of the user towards the first set of one or more item-related keywords is not positive;

based on determining the first sentiment of the user is not positive:
> request an additional natural language user input;
> extract a second set of one or more item-related keywords from the additional natural language user input;
> determine, from the additional natural language user input, that a second sentiment of the user towards the second set of one or more item-related keywords is positive;
> based on determining the second sentiment is positive:
> > analyze a user profile for the user and determine one or more categories from the user profile that are related to the second set of one or more item-related keywords, wherein the one or more categories are at least in part based on a user characteristic relating to a user demographic trait;
> > determine, based at least on a similarity between the one or more categories and the second set of one or more item-related keywords, a matching value between the natural language user input and one or more candidate item recommendations;
> > determine whether to trigger an item recommendation by comparing the matching value to a recommendation strength threshold; and
> > when the matching value meets or exceeds the strength threshold:
> > > trigger the one or more candidate item recommendations;
> > > rank the one or more candidate item recommendations; and
> > > provide an item recommendation based on the ranking,
> > > wherein the item is at least one of a product or a service.

17. The system of claim 16, wherein the one or more candidate item recommendations are derived from a machine learned item list populated from a plurality of official business accounts.

18. The system of claim 17, wherein the machine learned item list is populated from extraction and analysis of data from the plurality of official business accounts for a plurality of keywords and phrases related to one or more items that each of the plurality of official business accounts maintain.

19. The system of claim 18, wherein the plurality of official business accounts comprise one or more websites, one or more social media accounts, one or more social media feeds, and editorial content, generated by one or more entities affiliated with the plurality of official business accounts.

20. The system of claim 16, wherein the processor is further operative to the computer-executable instructions and operative to:
> analyze one or more words adjacent to the extracted second set of one or more item-related keywords;
> determine that the one or more adjacent words are classifiers for the extracted second set of one or more item-related keywords; and
> reduce a number of potential item recommendations based on determining the one or more adjacent words.

* * * * *